April 4, 1961  J. D. POST  2,978,098
COATING ALUMINUM FOIL WITH SILICONE
Filed April 29, 1958
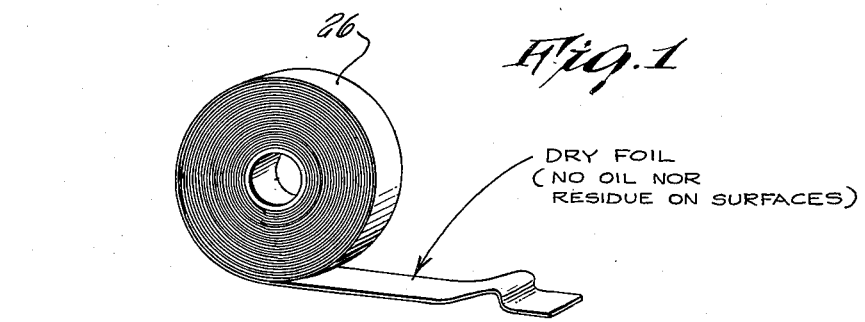
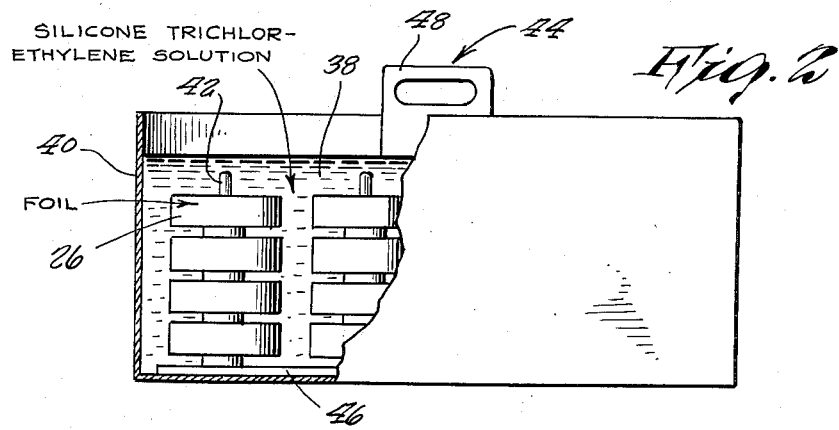
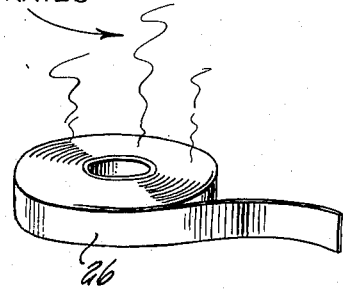
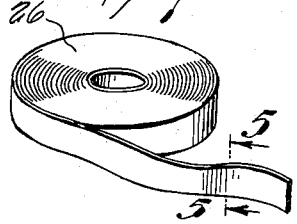
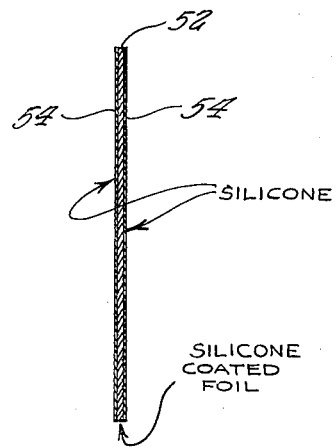
INVENTOR.
JAMES D. POST
BY
Moses, Nolte, Cavus & Berry
ATTORNEYS

United States Patent Office 2,978,098
Patented Apr. 4, 1961

2,978,098

COATING ALUMINUM FOIL WITH SILICONE

James D. Post, Danbury, Conn., assignor, by mesne assignments, to Republic Foil, Inc., Danbury, Conn., a corporation of Delaware Filed Apr. 29, 1958, Ser. No. 731,780

13 Claims. (Cl. 206—59)

This application is a continuation-in-part of application Serial No. 578,986, filed April 18, 1956, and now abandoned.

The present invention relates to a procedure which is employed in the manufacture of capacitors employing aluminum foil or the like. The invention has more particularly to do with providing, in an economical and efficient way, a lubricant film on the foil which will enable the foil, interleaved with paper insulation, to be wound tightly into a rolled capacitor without wrinkling or rupturing, the film being of such character that the dielectric properties of the foil are not impaired.

The product known as aluminum capacitor foil is plain, very thin aluminum strips in relatively narrow widths made by the various processes known to all aluminum foil manufacturers.

Before this invention, there were two types of capacitor foil, commonly known as follows:

(1) *So-called dry foil.*—This is foil from which the oil film received during processing has been completely removed by heat. It is undoubtedly the best type of foil from the standpoint that no impurities are left on the foil to be introduced into the finished capacitor.

(2) *So-called slick or textured foil.*—This is foil on which a lubricating film of rolling oil is intentionally left by one means or another in order to expedite or aid the further processing into a finished capacitor.

The rolling oil introduces impurities, of which the chief one is water. While the oil does not mix with water, it is still hygroscopic to a limited degree and will pick up a small amount of water from the atmosphere. The effect of ½% to 1% of water in the oil will reduce the insulating properties of the paper by about 50%. Since the rolling of the foil is conducted in the open, some moisture will inevitably be picked up from the atmosphere. The presence of moisture shortens the life of the capacitor, increases its power factor, and causes it to operate at a high, frequently a prohibitively high, temperature.

In spite of the obvious advantages of dry foil, certain capacitor manufacturers require slick or textured foil due to the limitations of their equipment.

The purpose of this invention is to provide the manufacturers who require a lubricating film on the foil, with a product which will suit their needs while reducing the impurities of the film to an absolute minimum, thereby improving the quality of the finished capacitor.

The silicone oils provide the lubricating film referred to in the last paragraph. The invention includes the method of application of such films.

The silicone oils are known to combine the desired lubricating properties with the desired freedom from adversely affecting the dielectric. The expedient of winding a roll of foil while applying a coating of silicone oil was tried, but the coating became excessive, and the cost proved prohibitive.

As a last resort, and almost in desperation, a tightly wound roll of dry aluminum foil was immersed in a trichlorethylene solution of silicone oil. When the roll was removed from the bath, the solvent was evaporated and the foil examined, with the surprising and gratifying result that the foil was found to have a very thin but adequate film of silicone lubricant covering its entire surface. This lubricated foil was found to run prefectly, to cut exactly as desired, and to be completely free from the adverse effects upon the dielectric paper which had characterized the use of foil rendered slick by the older, more conventional, rolling oil.

Further investigation has disclosed the fact that it is possible satisfactorily to lubricate dry aluminum foil while it is wound in the form of a very tight roll by submerging it for varying lengths of time, according to the width of the roll and the viscosity of the bath, in solutions of silicone oil having a wide range of viscosities, provided the oil is dissolved in a volatile organic solvent of low viscosity, within certain concentration ranges. It is a surprising fact that the film produced in this fashion is uniform axially of the roll as well as lengthwise of the foil. The treated roll can be freed of solvent while still in roll form. Both coating and elimination of solvent can be accomplished within a practical time interval. The foil in the roll has no greater tendency to stick or adhere than does foil which has been coated, freed of solvent, and then wound into rolls. Non-sticking is doubtless due to the oily nature of the silicone oils, but it is believed that anyone skilled in the art prior to my discovery would have considered it impossible satisfactorily to apply a lubricating film to aluminum foil while rolled. The foil in such rolls or spools is always wound under considerable tension and it would be natural to expect that each layer would be in direct metal-to-metal contact with the layers on both sides. It could not have been foreseen that a film forming composition would penetrate with practical uniformity between the layers of foil in a roll.

My experiments show that all silicone oils or fluids can be used in my coating procedure which have viscosities falling within the range of from about 30 centistokes to 50,000 centistokes. The higher viscosity products have the consistency of a grease and cannot be poured. They are more difficult to dissolve in the solvent used, but once dissolved they produce satisfactory coating solutions. These solutions produce coatings which are somewhat more greasy or slippery than those produced by the fluid silicone oils at the lower end of the viscosity scale. Otherwise, the coatings appear to be substantially identical when the oils are dissolved in the same solvent and at the same concentration.

Silicone oils are soluble in a large number of volatile organic solvents and any of these solvents can be used in my process which are of low viscosity; as most of them are. I have made most of my experiments using trichlorethylene as a solvent but carbon tetrachloride, chloroform, ethylene, dichloride, perchlorethylene, benzene, ethyl ether, toluene, xylene and di-isopropyl ether can be used. Any low-viscosity volatile solvent which is capable of dissolving a silicone oil to a concentration of at least 2% by weight is operative. The viscosities of the silicone oil solutions are very close to those of the solvent used and do not seem to be important for the purposes of this invention if a low-viscosity solvent is employed.

The temperature to be used in the coating step is immaterial. Room temperatures are the most practical to use, but temperatures either above or below room temperatures can be used with substantially the same results.

Accordingly it is an object of this invention to provide a method of coating a foil material with a film.

A further object of the invention is to provide a method of coating a tightly wound roll of aluminum foil with a silicone film.

A further object of the invention is to provide a coated aluminum foil.

A further object of the invention is to provide a tightly wound aluminum foil roll which is coated on each face with a uniform film of silicone oil.

Apparatus employed in carrying out a preferred method of treating the foil is disclosed in the annexed drawings which form part of this specification.

Fig. 1 shows a narrow roll of the foil before processing in accordance with the present invention;

Fig. 2 shows a number of narrow rolls like that of Fig. 1 mounted on a roll carrier and submerged in a lubricant film forming bath;

Fig. 3 indicates the step of evaporating solvent from a roll which has been subjected to the bath of Fig. 2;

Fig. 4 shows the roll of Fig. 3 after the solvent evaporation is complete; and

Fig. 5 shows a fragment of foil having films of silicone oil on its opposite faces.

According to the novel procedure of the present invention, the foil, in the form of wound rolls 26, is immersed in a bath 38 which consists of silicone oil dissolved in an organic volatile solvent. The bath 38 is provided in a suitable container 40. The rolls 26 are placed one above another on vertical pins 42 which are carried in fixed position on a suitable carrier 44. The carrier 44 comprises a floor member 46 and an upstanding carrying handle 48. Suitable spacer sleeves 50, placed on the pins 42 in alternation with the rolls 26, separate the rolls 26 from the floor member 46 and from one another. The time of immersion will be controlled as elsewhere explained herein.

When the period of immersion is completed, the carrier 44 is withdrawn from the bath and the solvent is evaporated as illustrated in Fig. 3, with the rolls still maintained in tightly wound condition.

In Fig. 4 the roll 26 of aluminum foil, still tightly wound, but with a lubricating film of silicone oil covering both its faces, and free of solvent, is illustrated.

A fragment of the foil of Fig. 4 is illustrated in cross section in Fig. 5. The body 52 of the foil is shown in the middle and the films of silicone oil 54, 54, are shown at opposite sides of the foil.

The immersion operation can be conducted either as a batch procedure or as a continuous operation, but preferably, and as shown, it is a batch procedure. It is merely necessary to prepare a bath of organic solvent containing the silicone oil dissolved therein, preferably to a concentration of from about 2 to 8% by weight. The rolls of aluminum foil are then mounted on the carrier 44 as shown, and placed in the bath. After immersion for a time sufficient for the silicone oil to penetrate at least partially, to the center of the rolls, the latter are removed. If the rolls are removed before complete penetration has been achieved, penetration will complete itself after the rolls have been removed from the bath because of the spreading property of the residue of fluid. It is then only necessary to eliminate the volatile solvent.

The time and temperature required in the solvent removing operation depends primarily upon the volatility (boiling point) of the solvent employed. Solvents which evaporate readily at room temperature, such as ethyl ether, ethylene dichloride, trichlorethylene and chloroform, can be removed readily from the coated coils at room temperature. Superficial removal of the solvent requires only a few minutes at room temperature and the rolls can then be packaged, if desired, even though it may require an additional 12 to 24 hours for the odor of the solvent to disappear. Solvent removing is, of course, speeded up by heating the coated rolls and for the greatest speed temperatures of up to approximately 500° F. can be used. When trichlorethylene is used as a solvent, surface solvent removal occurs at room temperatures within about 5 to 10 minutes but the penetrating odor of the solvent remains for about 24 hours. If placed in an oven operating at about 212° F. the odor disappears within from about 1 to 2 hours. Traces of residual solvent in the rolls do no harm since these evaporate as soon as the foil is unwound.

The solvents used in my process are expensive, of course, but a solvent recovery system can be employed if desired. The consumption of solvent is restricted by the fact that immersion takes place with the rolls in tightly wound condition. The cost of the coating equipment used in my process is only a fraction of that required in conventional processes.

I prefer to employ the non-flammable solvents in the above list. Ethylene dichloride, perchlorethylene and trichlorethylene are the preferred solvents.

The time for immersion in the coating bath required to produce penetration of the silicone oil to the centers of the rolls depends upon the width of the rolls. For a roll having a width of 3 inches a time of 1 hour is adequate. Narrower rolls are satisfactorily coated in shorter times while wider rolls require longer times, the times required being roughly proportional to the widths of the rolls. The time required doubtless also depends to a slight extent upon the tension used in winding the rolls, but all rolls of foil are conventionally wound tightly. The minimum immersion time required can be determined quickly and easily by the test. It is merely necessary to partly unwind a roll which has been immersed in a coating bath for a given length of time. If the foil is found to be uniformly coated the time of immersion used is adequate. The silicone oil seems to creep over the surface of the aluminum foil and, if it has not quite penetrated to the center of a roll while immersed in the coating bath, penetration can usually be completed during a draining and/or a drying operation. A longer period of immersion than the minimum does no harm and does not increase the thickness of the silicone coating. Use of the silicone oils falling close to the high end of the viscosity range set out previously does not appear to increase the thickness of the coating. In all cases the coating obtained is extremely thin—substantially monomolecular.

My invention can be described in greater detail by reference to the following specific examples which represent practical operating embodiments of my process:

*Example 1*

I made up a coating bath by dissolving one part of a silicone oil or fluid, having a viscosity of 100 cs. at 100° F., in 20 parts of trichlorethylene. A roll of aluminum foil, having a width of 1½ inches and a thickness of 0.00025 inch, was immersed in this bath for 1 hour. It was supported in the bath by a dowel passing through its center. It was then air dried for 24 hours. Upon inspection the foil was found to be uniformly coated throughout the roll with a satisfactory coating of the silicone oil. The oil used was manufactured by General Electric Company and identified by the notation "SF 96 (100)." It has a maximum pour point of $-63°$ F., a specific gravity of 0.965 at 20/20° C., a flash point of 824° F., a refractive index of 1.403, specific heat of 0.370 at 80° F. (gram calories/g./° C.) and an expansion coefficient of 9.68 per ° C. $\times 10^{-4}$. Foil coated in this manner is particularly useful in making condensers.

*Example 2*

In this example I dissolved 1 part of a silicone oil having a viscosity of 30,000 cs. at 100° F. in 20 parts of trichlorethylene to make a coating bath. A roll of aluminum foil, having a width of 1½ inches was immersed for one hour in this bath, followed by air drying for 24 hours. The coating on the foil was found to be uniform and satisfactory in every way. The silicone oil used in this example was manufactured by Dow-Corning Corp. and is called "200 fluid." It has a specific gravity of 0.975, a flash point of 600° F., a refractive index of 1.4035, a viscosity-temperature coefficient of 0.61, a dielectric constant of 2.77 and a freezing point of —44° C.

The trichlorethylene solvent used in the above examples can be replaced by any low viscosity organic solvent for silicone oils with substantially the same results. The concentration of oil used in the coating bath can be varied at least from about 2% to 8% by weight. And any silicone oil having a viscosity of from 30 cs. to 50,000 cs. can be substituted for the specific oils used in the examples with substantially the same results.

While I have described what I consider to be the most advantageous embodiments of my process it is evident, of course, that various modifications can be made in the specific procedures which have been disclosed without departing from the purview of this invention. I believe that my method is practical for the coating of aluminum foil of any thickness and of any of the usual widths. Of course, there is probably an upper limit to the width of roll which can be coated within a reasonable time interval, but since the coating bath can be operated at room temperature and requires but little maintenance and since longer immersion periods than the minimum do no harm, it may be found practical to coat rolls requiring overnight or even several days' immersion to produce uniform coating.

While I have described coating at ordinary temperatures and pressures, it is evident, of course, that both temperature and pressure can be varied within the scope of this invention. Somewhat more rapid coating can be accomplished, for example, by supporting the rolls to be coated in an airtight container, exhausting the air from the container, flooding the container with silicone coating solution and then increasing the pressure on the latter above atmospheric pressure. If the coating is conducted at temperatures close to or exceeding the boiling point of the solvent used in the coating bath, this speeds up the drying operation and reduces slightly the time required for the coating operation. The added expense of such expedients would be justified only in rare cases, however. The most practical procedure seems to be one conducted at room temperature and atmospheric pressure.

While I have described the rolls of foil as being spaced in the coating bath, this is not necessary since it is possible merely to pile the rolls into the coating bath. For ease of handling, however, it is best to mount the rolls on rods and to support the latter by means of sockets provided on either side of the vessel containing the coating bath.

While the most important use for aluminum foil coated in accordance with the present invention is in the making of capacitors and condensers, it is also useful for packaging, lining baking pans, etc., and for all purposes requiring the use of aluminum foil which has high lubricity and non-sticking characteristics.

While the most practical concentrations of silicone oil in my coating bath are within the range of from about 2 to 8% it is possible, of course, especially in the case of the silicone oils at the lower end of the viscosity range set out, to use considerably higher concentrations. In all cases, however, the silicone oil should constitute no more than a small proportion of the coating bath, i.e., the concentration of the silicone oil should be small or low so that the viscosity of the solution approaches that of the low-viscosity solvent.

I have described what I believe to be the best embodiments of my invention. I do not wish, however, to be confined to the embodiments shown, but what I desire to cover by Letters Patent is set forth in the appended claims.

I claim:
1. The process of coating the separate layers of a tightly wound roll of aluminum foil, which comprises immersing the roll in its tightly wound state in a coating bath which consists essentially of a silicone oil having a viscosity from about 30 centistokes to 50,000 centistokes and a low viscosity volatile organic solvent for said silicone oil, for a period sufficient to cause the silicone oil solution to penetrate completely between the layers of said foil, and removing said roll from said bath.

2. The process of claim 1, wherein said organic solvent is trichlorethylene.

3. The process of claim 1, wherein said organic solvent is ethylene dichloride.

4. The process of claim 1, wherein said organic solvent is perchlorethylene.

5. The process of claim 1, wherein said organic solvent is carbon tetrachloride.

6. The process of claim 1, wherein said organic solvent is chloroform.

7. A roll of aluminum foil produced by the process according to claim 1.

8. The method of providing a roll of wound aluminum foil with a substantially uniform thin lubricating film composed exclusively of silicone oil throughout its opposite surfaces, which comprises immersing the roll in tightly wound condition in a bath which consists essentially of a solution of silicone oil having a viscosity within the limits of 30 centistokes to 50,000 centistokes, in a low viscosity, volatile organic solvent, for a sufficient time to permit the solution to penetrate substantially to all portions of the foil surfaces, withdrawing the roll from the bath, and causing the solvent to be evaporated while the roll is maintained in a wound condition.

9. A method as set forth in claim 8 in which the solvent of the bath is chosen from the group consisting of trichlorethylene, carbon tetrachloride, chloroform, ethylene dichloride, perchlorethylene, benzene, ethyl ether, toluene, xylene, and di-isopropyl ether.

10. A method of providing aluminum foil with a substantially uniform, thin, uncontaminated lubricating film composed exclusively of silicone oil which involves providing a tightly wound roll of aluminum foil, then immersing the wound roll in a bath which consists essentially of a solution of silicone oil having a viscosity within the limits of 30 centistokes to 50,000 centistokes, in a low viscosity volatile organic solvent, for a sufficient time to permit the solution to penetrate substantially to all portions of the foil surfaces, withdrawing the roll from the bath, and causing the solvent to be evaporated while the roll is maintained in a tightly wound condition.

11. The method of providing aluminum foil with a substantially uniform, thin, uncontaminated lubricating film composed exclusively of silicone oil which involves providing a group of tightly wound rolls of aluminum foil, then simultaneously immersing the wound rolls in a bath which consists essentially of a solution of silicone oil having a viscosity within the limits of 30 centistokes to 50,000 centistokes in a low viscosity volatile organic solvent, for a sufficient time to permit the solution to penetrate substantially to all portions of the foil surfaces, withdrawing the rolls from the bath, and causing the solvent to be evaporated while the rolls are maintained in a wound condition.

12. The process of coating separate layers of a tightly wound roll of aluminum foil, which comprises immersing the roll in its tightly wound state and with its axis substantially vertical into a coating bath which consists essentially of silicone oil having a viscosity from about 30 centistokes to 50,000 centistokes and a low viscosity volatile organic solvent for said silicone oil, for a period sufficient to cause the silicone oil solution to penetrate completely between the layers of said foil, and removing said row from said bath.

13. The process of coating the separate layers of a tightly wound roll of aluminum foil according to claim 12, wherein a plurality of tightly wound rolls of aluminum foil are placed on an upright spindle and the spindle is positioned in said bath to maintain the rolls in an upright position with their axes substantially vertical.

References Cited in the file of this patent

UNITED STATES PATENTS 2,437,606    Kaufman   ------------- Mar. 9, 1948

FOREIGN PATENTS 363,489    France ------------------ May 7, 1906
H 10,337    Germany -------------- Jan. 12, 1956

OTHER REFERENCES

Chemistry of Silicones, Rochow, 2d Edition, 1947, John Wiley & Sons Inc., New York (p. 70 relied on).

Silicones and Their Uses, McGregor, 1954, McGraw-Hill Book Co., Inc. (p. 69 relied on).